US 7,676,723 B2

(12) United States Patent
Cuylen

(10) Patent No.: US 7,676,723 B2
(45) Date of Patent: Mar. 9, 2010

(54) METHOD FOR THE PROTECTED TRANSMISSION OF DATA, PARTICULARLY TRANSMISSION OVER AN AIR INTERFACE

(75) Inventor: Michael Cuylen, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 1161 days.

(21) Appl. No.: 11/086,566

(22) Filed: Mar. 23, 2005

(65) Prior Publication Data
US 2005/0229084 A1  Oct. 13, 2005

Related U.S. Application Data

(63) Continuation of application No. PCT/DE03/03003, filed on Sep. 10, 2003.

(30) Foreign Application Priority Data
Sep. 23, 2002  (DE) ................................. 102 44 135

(51) Int. Cl.
*G08C 25/02* (2006.01)
(52) U.S. Cl. ...................... 714/748; 714/752; 714/776; 714/755; 714/704
(58) Field of Classification Search .................. 714/748
See application file for complete search history.

(56) References Cited

U.S. PATENT DOCUMENTS 3,646,518 A * 2/1972 Weinstein .................... 714/751

(Continued)

FOREIGN PATENT DOCUMENTS

DE           44 01 852 C1      5/1995

(Continued)

OTHER PUBLICATIONS

Giuliano Benelli et al., A Coding and Retransmission Protocol for Mobile Radio Data Transmission, Vehicular Technology Conference, 1999. VTC 1999—Fall. IEEE VTS 50$^{th}$ Amsterdam, Netherlands Sep. 19-22, 1999, IEEE, Sep. 19, 1999, pp. 2505-2509, Piscatway, New Jersey.

(Continued)

*Primary Examiner*—M. Mujtaba K Chaudry
*Assistant Examiner*—Enam Ahmed
(74) *Attorney, Agent, or Firm*—Staas & Halsey LLP

(57) ABSTRACT

The method relates to the protected transmission of data (D0-D4), the coding ('S,' '0'-'F') of which is represented, respectively, by a sequence (FR0-FR4) of a predefined number of on and off values (Z1, Z0). A count value (C) representing the predefined number is formed by changing the count direction (F, R) after each on value and incrementing or decrementing the count value with each off value. An error information (F1, F2) is generated if a first end value (EC), which is transmitted together with the data as a coded sequence (SIG) of the count value C, differs from a second end value (EC1, EC2), which, like the count value, is formed from the transmitted sequence. The method is advantageously used in identification systems (IS), in mobile data carriers (DT) and in read-write devices (SLG). This affords the advantage that a data transmission error can be detected quickly and with high reliability by using a simple forward and backward counter (CNT). The counter can be implemented with little circuit complexity by a simple software program or by an electronic circuit, e.g., by a binary cycle counter.

17 Claims, 3 Drawing Sheets

U.S. PATENT DOCUMENTS

| | | | |
|---|---|---|---|
| 4,133,030 A * | 1/1979 | Huettner et al. | 710/1 |
| 4,284,490 A * | 8/1981 | Weber | 204/298.08 |
| 5,107,361 A * | 4/1992 | Kneidinger et al. | 398/98 |
| 5,111,463 A * | 5/1992 | Zook | 714/762 |
| 5,373,502 A * | 12/1994 | Turban | 370/441 |
| 5,815,508 A * | 9/1998 | Wadzinske et al. | 714/704 |
| 5,901,328 A * | 5/1999 | Ooe | 710/5 |
| 6,141,784 A * | 10/2000 | Davis et al. | 714/748 |
| 6,307,517 B1 | 10/2001 | Lee | |
| 6,411,629 B1 * | 6/2002 | Bentall et al. | 370/458 |
| 6,553,534 B2 * | 4/2003 | Yonge et al. | 714/774 |
| 6,836,208 B2 * | 12/2004 | Kuttruff et al. | 340/10.51 |
| 6,980,978 B2 * | 12/2005 | Charron et al. | 707/1 |
| 7,103,824 B2 * | 9/2006 | Halford | 714/759 |
| 2003/0081592 A1 * | 5/2003 | Krishnarajah et al. | 370/352 |

FOREIGN PATENT DOCUMENTS

| | | |
|---|---|---|
| EP | 0 430 291 A2 | 6/1991 |
| EP | 0 680 002 A2 | 11/1995 |
| WO | WO 00/11592 A2 | 3/2000 |
| WO | WO 02/27642 A1 | 4/2002 |

OTHER PUBLICATIONS

Identification cards—Contactless integrated circuit(s) cards—Vicinity cards—Part 2: Air interface and initialization, ISO/IEC 15693-2, Jul. 1, 2001, pp. 1-19.

* cited by examiner

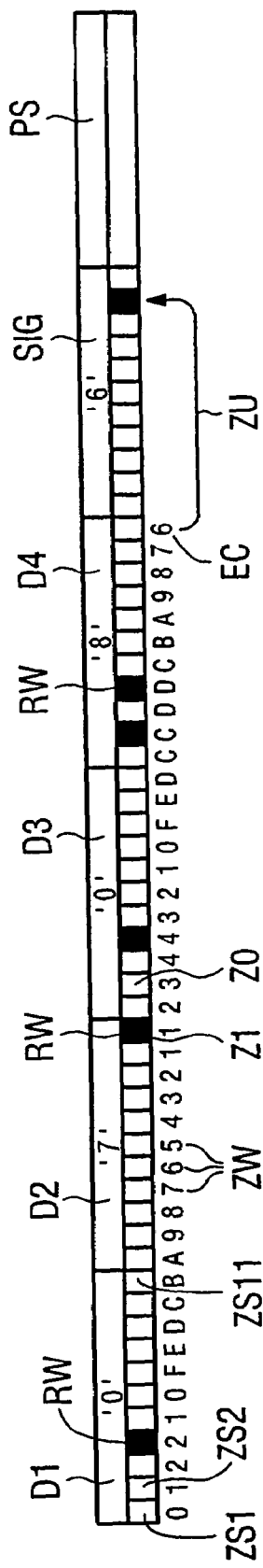
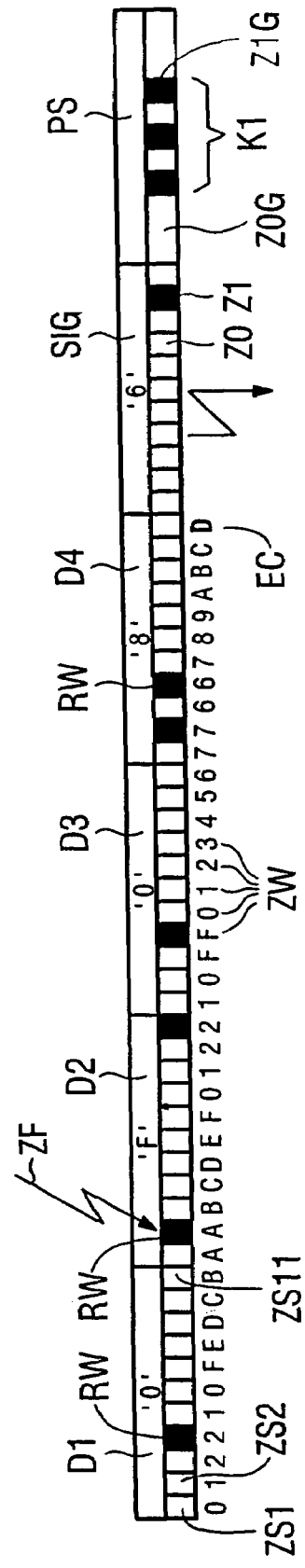
FIG 3
FIG 4

METHOD FOR THE PROTECTED TRANSMISSION OF DATA, PARTICULARLY TRANSMISSION OVER AN AIR INTERFACE

This is a Continuation of International Application PCT/DE03/03003, with an international filing date of Sep. 10, 2003, which was published under PCT Article 21(2) in German, and the disclosure of which is incorporated into this application by reference.

FIELD AND BACKGROUND OF THE INVENTION

The invention relates to a method for the protected transmission of, in particular, relatively long data sequences, the coding of which is represented by a sequence of a predefined number of on and off values. The invention further relates to a mobile data memory, a read-write device for carrying out the method and an identification system with the read-write device and at least one mobile data memory.

Contactless identification systems are based on contactless transmission methods. These methods can be based, e.g., on electromagnetic means, using infrared or ultrasound technology. Such systems are used, for example, to identify persons or moving goods. For this purpose, the necessary data are transmitted from a read-write device via a contactless data transmission link, e.g., an air interface, to a mobile data memory and back again. The contactless identification method also makes it possible to acquire data, e.g., while the mobile data memory moves past a read-write device. To enable the mobile data memories to be used for an indefinite period of time, the integration of energy storage devices, e.g., batteries, is dispensed with. The necessary electric power is picked up externally, i.e., from an electric or magnetic field originating from the read-write device.

To enable communication of a read-write device with such mobile data memories, suitable transmission and coding methods are required, which ensure the power supply of the electronics on the mobile data memory as well as compliance with radio regulations. In addition, only certain frequency bands are typically available for the transmission of data, e.g., the ISM (Industrial, Scientific & Medical) frequency bands for industrial, scientific and medical applications. To ensure a continuous power supply, a carrier frequency modulated with the data to be transmitted is switched off only for a maximum time interval. Within this time period, a previously charged energy storing device in the mobile data memory must be capable of bridging the power supply. Conversely, data is transmitted from the mobile data memory to the read-write device using load modulation. Load modulation can be continuous for a maximum time interval or, as an alternative, carrier frequency-modulated with an auxiliary carrier. Such methods are known, for example, from ISO/IEC Standard 15693, Part 2, "Air Interface and Initialization," or as time slot methods for operation in an ISM frequency band in accordance with ISO/IEC Standard 14443.

Data transmission between a read-write device and a mobile data memory may be subject to interference, however. In the case of data transmission by way of inductive coupling, for example, this could be electromagnetic interference sources, e.g., motors, solenoid valves, welding robots, etc., which are operated in the immediate vicinity. This can result in faulty data transmission.

To reduce this problem, suitable protection methods are known in the art, e.g., generating and appending a CRC (Cyclic Redundancy Check) word or a parity bit to the end of the data or the data sequence to be transmitted.

Using a parity bit for the protected transmission of data keeps the computational cost extremely low compared with generating a CRC word. Consequently, the error detection probability for a faulty data sequence is also not very high. If during data transmission, two time slots, for example, are faulty within a transmitted sequence, then the value of the parity bit does not change if the values of the time slots are complementary.

The applicant has previously filed a patent application (Application No. 10214188.6) for a solution to this problem. The object stated therein was attained by a method for the protected transmission of data, the coding of which is represented, respectively, by a sequence of a predefined number of on and off values. A count value representing the predefined number is formed by changing the count direction after each on value and incrementing or decrementing the count value with each off value. An error information is generated if a first end value, which is transmitted as a coded sequence of the count value together with the data, differs from a second end value, which, like the count value, is formed from the transmitted sequence. This will be briefly explained again with reference to FIG. 3.

The method described in the aforementioned patent application is advantageous for short data sequences. A fault can be readily detected with the aid of the coded transmission and the partial signature. This method enables a coded transmission of a few bytes of data information.

For longer data sequences, that is to say, with an increasing number of transmitted time slots, the probability of an error in the transmitted data sequence increases. Starting from a length of approximately 20 bytes of coded data to be transmitted, this method is no longer advantageous.

The resulting problem is that the use of the above-described method in identification systems consisting of mobile data memories and read-write devices remains limited to a few bytes of coded data to be transmitted.

OBJECTS OF THE INVENTION

Thus, an object of the invention is to provide a method, a mobile data memory, a read-write device and an identification system with mobile data memories and a read-write device, which enable protected and effective transmission of longer data sequences.

SUMMARY OF THE INVENTION

The above object is attained by a method for the protected transmission of data packets. The data packets are each divided into a sequence of data blocks and the data blocks are each divided into a sequence of data, such that the coding of the data is represented, respectively, by a sequence of a predefined number of on and off values. A protection datum is formed, respectively, from the preceding data and a protection block, respectively, from the preceding data blocks. A first data request is made if the protection datum transmitted together with the data differs from a protection datum formed in the same manner upon receipt of the data. Further, a second data request is made if the protection block transmitted together with the data blocks differs from a protection block formed in the same manner upon receipt of the data.

The object is further attained by a mobile data memory and a read-write device operable to carry out the method according to the invention. Finally, the object of the invention is attained by an identification system with the read-write device and at least one mobile data memory. Advantageous further embodiments of the method and the devices are set forth in the dependent claims.

An advantage of the invention is that an error can be detected in transmitted short data sequences at little computational cost.

A repeat of the incorrectly transmitted short data sequences can be advantageously requested immediately without having to wait until the end of the transmission of the longer data sequence with the "more protected" CRC block.

A further advantage is that an error transmitted in a longer data sequence is detected with great reliability at the end since a highly reliable error detection method is used only here, and a repeat of the entire longer data sequence is then prompted immediately.

BRIEF DESCRIPTION OF THE DRAWINGS

The invention will now be described in greater detail with reference to the figures in which:

FIG. 3 shows an exemplary transmission of a data block with four pieces of data, a protection datum and a pause block according to the invention, where the coding of the data is represented by a sequence of on and off values, FIG. 4 shows the exemplary transmission of a data block according to FIG. 3 in the event of an error and a first data request according to the invention for a repeat of the last data block.

DETAILED DESCRIPTION OF THE PREFERRED EMBODIMENTS

Figure 1:
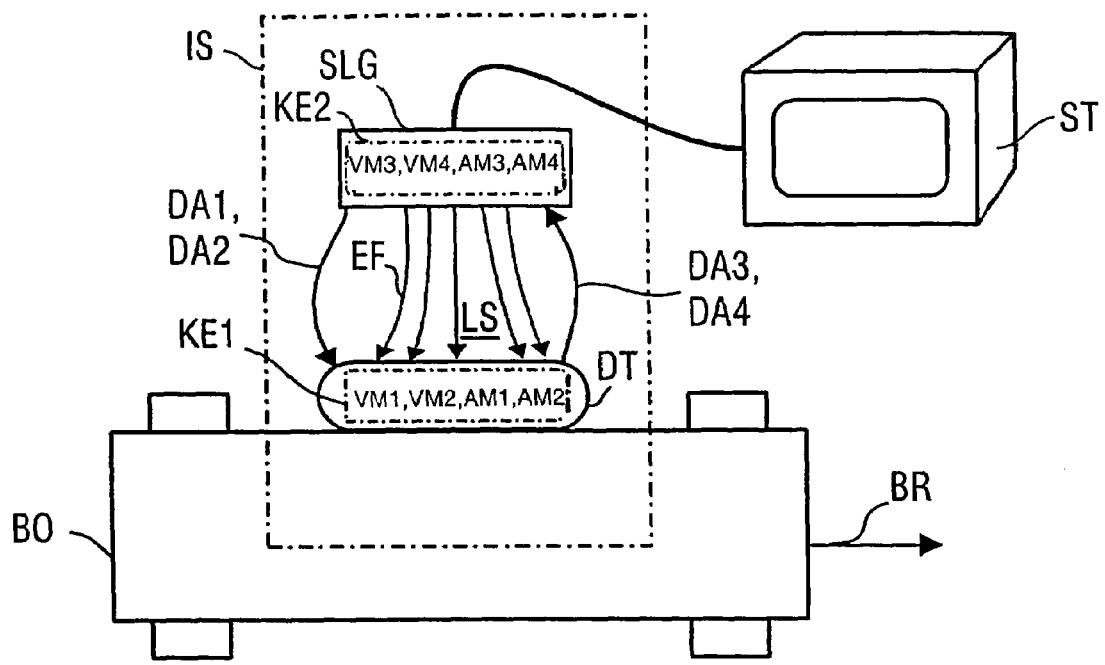
FIG. 1 shows an example of an identification system, which has a read-write device and a mobile data memory, each with a coding device for carrying out the method according to the invention for the contactless exchange of data.

FIG. 1 shows, by way of example, an identification system IS, which has a read-write device SLG and a mobile data memory DT, each equipped with a coding device KE1, KE2 operable to carry out the method according to the invention. The mobile data memory DT is mounted on a moving object BO, e.g., a transport means, which is moving in a movement direction BR relative to the read-write device SLG. In the example shown in the figure, data are transmitted over a contactless data transmission link LS, e.g., an air interface. In the top right portion of the figure, a control computer ST is shown by way of example, which communicates with the read-write device SLG via an interface. The data is exchanged via this interface between the control computer ST and the read-write device SLG, e.g., for data acquisition. In addition, the corresponding coding devices KE1, KE2 for carrying out the method according to the invention have, e.g., comparers VM1, VM2, VM3, VM4 as well as queriers AM1, AM2, AM3, AM4 as shown. The comparers VM serve to detect a transmission error and to generate a corresponding data request DW, BW to repeat the data. The queriers AM effect the retransmission of the preceding data D1-Dn or the data blocks B1-Bn to the corresponding distant device DT, SLG if a data request DW, BW is received.

A repeat of the incorrectly transmitted data can advantageously be prompted immediately without the need to wait for the end of the transmission of a longer data sequence.

The mobile data memory DT is simultaneously supplied with power over the exemplary air interface LS. Power flow lines EF illustrate the power flow from the read-write device SLG to the mobile data memory DT. The source of the required power can, for example, be electric or magnetic fields.

Figure 2:
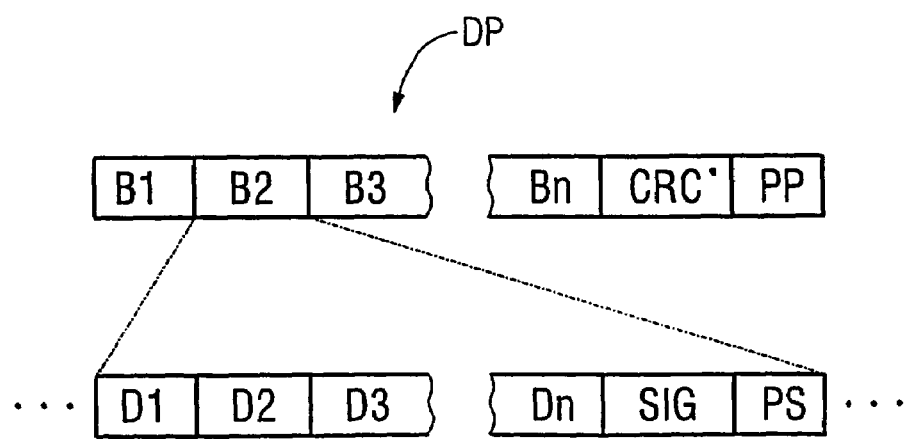
FIG. 2 shows an exemplary structure of a data packet according to the invention.

FIG. 2 shows an exemplary structure of a data packet DP according to the invention. The data packet DP is divided into a predefined number of data blocks B1-Bn. The respective data blocks B1-Bn are followed by a protection block CRC, which according to the invention is computed from the preceding data blocks B1-Bn. This can be accomplished, for example, using the known cyclic redundancy check (CRC) method. The error detection probability of such an algorithmic method is very high. As illustrated in the figure, the protection block CRC according to the invention has the same length as a data block B1-Bn. According to the invention, each data block B1-Bn is furthermore terminated by a second pause block PP. This, too, is shown in the example of the figure.

In the example shown, each data block B1-Bn is divided into a sequence of data D1-Dn. The example depicted in this figure illustrates the division of the data block B2. According to the invention, the data D1-Dn is followed by a protection datum SIG, which is formed from the preceding data D1-Dn. The protection datum SIG can be coded in the same manner as a datum D1-Dn. Preferably, a datum D1-Dn or the protection datum SIG is a nibble with a value of 16, such that two nibbles encode a byte, conventional in computing. The corresponding representation of a nibble in hexadecimal notation is '0' . . . 'F.' The data D1-Dn is followed by a first pause block PS, which according to a further embodiment of the invention can have the same length as a second pause block PP. This is illustrated in the example of FIG. 2.

An advantage is that an error transmitted in a longer data sequence DP is detected with high reliability at the end since a highly reliable error detection procedure is used only here, and a repeat of the entire longer data sequence DP is then prompted immediately.

For short data sequences B1-Bn, a transmitted error can advantageously be detected at little computational cost.

FIG. 3 illustrates, by way of example, a transmission according to the invention of a data block B2 with four pieces of data D1-D4, a protection datum SIG and a first pause block PS. The coding '0-F' of the data D1-D4, e.g., of exemplary nibbles, is represented by a sequence of on and off values Z1, Z0. Each datum D1-Dn is structured in a time slot frame R1-Rn, such that a time slot frame R1-Rn has the sequence of on and off values Z1, Z0. The sequence of time slot frames R1-Rn is followed by a correspondingly structured signature frame RS containing the protection datum SIG, which is coded in the same manner '0-F.' This is illustrated in the example of the figure where the coding '6' of the protection datum SIG is represented by the signature frame RS. In addition, in the example shown in the figure, each time slot frame R1-R4 and the protection frame RS were divided, by way of example, into 11 time slots ZS1-ZS11.

For the protected transmission of the data D1-D4, the count direction RW is changed after each on value Z1, and a count value ZW is incremented or decremented with each off value Z0. In the example depicted in the figure, the first count value ZW selected for the first time slot ZS1 in the time slot frame R1 was the count value ZW '0' and the starting count direction RW selected was the forward count direction. The count values ZW move cyclically within a hexadecimal value range of '0-F.' At the end of the count value formation, the first end value EC with the value '6' corresponding to the previously determined coding '0'-'F' is written into the time slots ZS1-ZS11 of the protection frame SIG by the assignment ZU.

On the receiver side of the remote device DT, SLG, the count value is formed in the same manner, such that the encoded transmitted protection datum SIG can be compared with the generated coded count value SIG'.

FIG. 4 shows, by way of example, the transmission of a data block B2 according to FIG. 3 in the event of an error ZF and a first data request DW according to the invention for a repeat of the last data block B2. In contrast to the example depicted in FIG. 3, a transmission fault ZF causes a count error, such that the transmitted coded protection datum SIG does not correspond to the generated coded count value SIG'. In this example, the most recently determined end value EC has the value 'D' instead of the value '6.'

In the following first pause block PS, the remote receiving device DT, SLG immediately outputs or transmits a coded characteristic data repeat sequence K1 of a predefined number of on and off values Z0G, Z1G for a first data request DW for the advantageous immediate repeat of the preceding data D1-Dn. In the example illustrated in the figure, the data repeat sequence K1 has a triple Z1G/Z0G sequence, which, advantageously, does not correspond to a preceding data coding and is therefore unique for the remote receiving device DT, SLG.

Figure 5:
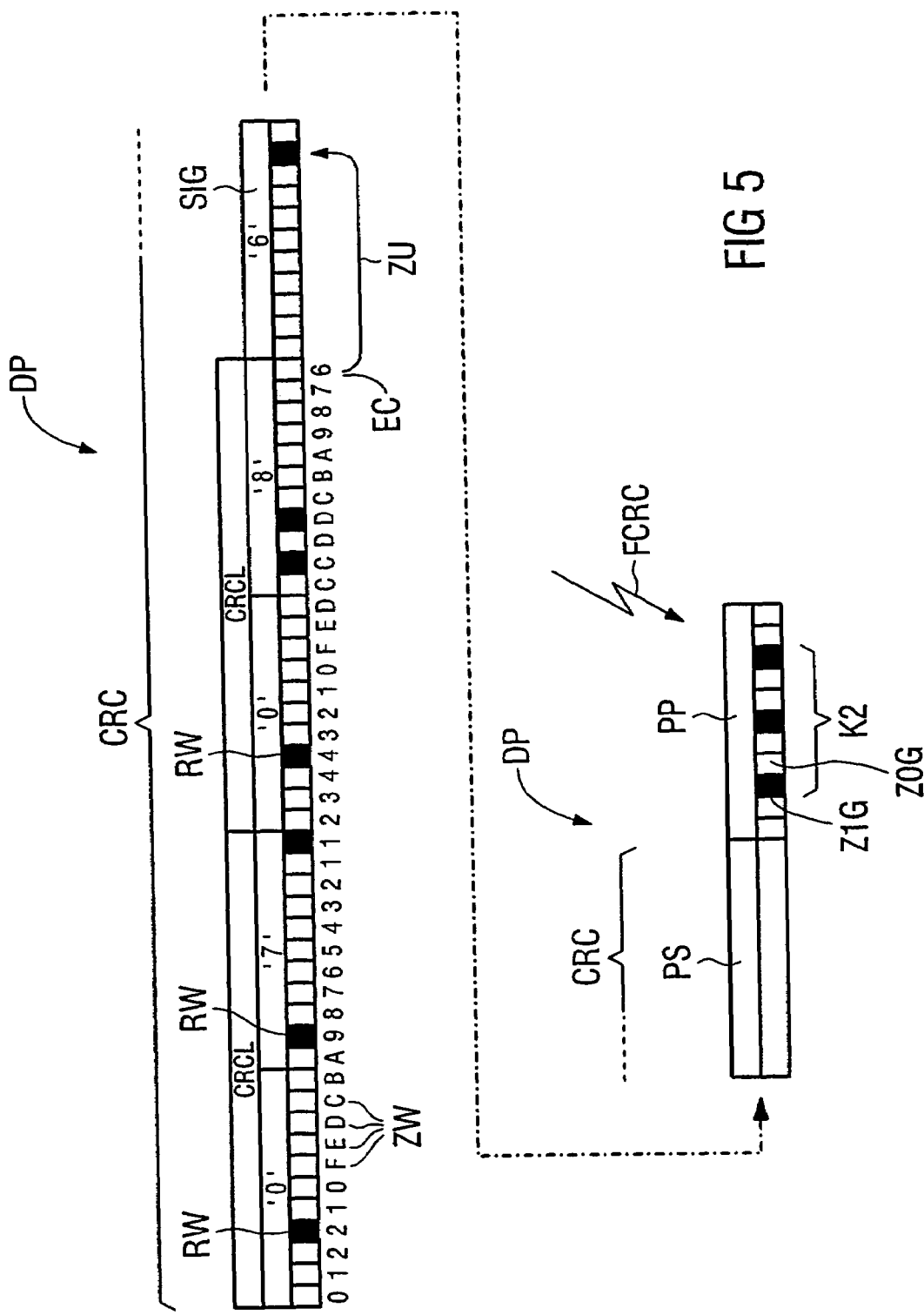
FIG. 5 shows an incorrect transmission of a data packet by way of example and a second data request according to the invention for a repeat of all the data blocks.

FIG. 5 shows, by way of example, a faulty transmission FCRC of a data packet DP and an immediately following second data request BW according to the invention for a repeat of all the data blocks B1-Bn. As described above, the transmitted data blocks B1-Bn are followed by a protection block CRC, which is coded in the same manner as a data block B1-Bn to simplify data processing. In the example depicted in FIG. 5, the protection block CRC, corresponding to the example shown in FIG. 2 and FIG. 3, encompasses four pieces of data CRC1-CRC4, such that each CRC datum CRC1-CRC4 encodes one byte. For every two bytes, for example, the upper byte CRCH and the lower byte CRCL form a CRC word. Each CRC datum CRC1-CRC4 is assigned a CRC protection frame RCRC1-RCRC4 for the coding in time slots Z1, Z0.

A second data request BW is coded as a second data repeat sequence K2 of a predefined number of on and off values Z1G, Z0G in the second pause block PP of the remote device DT, SLG, if the protection block CRC of the data packet DP received together with the data blocks B1-Bn differs from a protection block CRC' formed in the same manner.

This has an advantage that an error FCRC transmitted in a longer data sequence DP is detected with high reliability at the end since a highly reliable error detection method is used only here, and a repeat of the entire longer data sequence DP is then prompted immediately. Advantageously, this also makes it possible to detect a transmission error ZF within a data block B1-Bn, even if a transmitted protection datum SIG is the same as a protection datum SIG' formed in the same manner by the remote device DT, SLG. One possible cause is a double error in the transmission of a data block B1-Bn.

In the example depicted in the figure, the data repeat sequence K2 advantageously has a triple Z1G, Z0G, Z0G sequence, which does not correspond to any preceding data coding and advantageously also differs from the above data repeat sequence K1. As a result, this sequence K2 is likewise unique for the remote receiving device DT, SLG.

Finally, to carry out the method according to the invention, an identification system IS with a modulation method based on the ISO/IEC Standard 14443 or the ISO/IEC Standard 15693 can be operated in an ISM frequency band, particularly in an ISM frequency band of 13.56 MHz. In addition, data packets DP can be exchanged in the identification system IS over a contactless data transmission link LS between at least one read-write device SLG and at least one mobile data memory.

This is advantageous, in particular, for an air interface LS coupling the read-write device SLG and the mobile data memory DT by inductive means.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. Method for protected transmission of data packets, the method comprising:
   a) dividing at least one of the data packets into a sequence of data blocks, dividing at least one of the data blocks into a sequence of data, wherein a coding for each data in said sequence of data is represented by a sequence of a predefined number of on and off values,
   b) forming a protection datum from the sequence of data and a protection block from the sequence of data blocks,
   c) generating a first data request to repeat transmission of said sequence of data if the protection datum transmitted together with the data differs from a protection datum formed in a same manner upon receipt of at least one data block, and
   d) generating a second data request to repeat transmission of said at least one data block if the protection block transmitted together with the data blocks differs from a protection block formed in a same manner upon receipt of at least one data packet.

2. Method as claimed in claim 1, wherein the sequence of data is followed by a first pause block, and the sequence data blocks are followed by a second pause block.

3. Method as claimed in claim 1, wherein the protection datum is coded in the same manner as a datum in the sequence of data.

4. Method as claimed in claim 1, wherein a protection block is formed in a same manner as the sequence of data using protection block data.

5. Method as claimed in claim 1, wherein the first data request is coded as a first data repeat sequence of a predefined number of on and off values in the first pause block.

6. Method as claimed in claim 1, wherein the second data request is coded as a second data repeat sequence of a predefined number of on and off values in the second pause block.

7. Method as claimed in claim 5, wherein the first data repeat sequence differs from the sequence of the predefined number of on and off values.

8. Method as claimed in claim 6, wherein the second data repeat sequence differs from the sequence of the predefined number of on and off values.

9. Method of claim 1, wherein the protection datum is formed using a procedure comprising:
   maintaining a count of the sequence of the predefined number of on and off values;
   changing a count direction with each on value; and
   incrementing or decrementing the count based on said count direction with each off value.

10. Method of claim 9, wherein the count moves cyclically within a hexadecimal range of values 0-F.

11. A mobile data memory for the contactless exchange of protected data packets with a read-write device, having a first coding device, the first coding device comprising:
- a first comparer operable to generate a first data request if a first protection datum received together with data in the data packet differs from a second protection datum formed in a same manner as the first protection datum from the received data packet,
- a second comparer operable to generate a second data request if a first protection block of the data packet received together with data blocks differs from a second protection block formed in a same manner as the first protection block from the received data blocks,
- a first querier operable to repeat previously transmitted data after detection of a first data request, and
- a second querier operable to repeat previously transmitted data blocks after detection of a second data request.

12. A read-write device for the contactless exchange of protected data packets with a second mobile data memory, having a second coding device, the second coding device comprising:
- a third comparer operable to generate a first data request if a first protection datum received together with data of the data packet differs from a second protection datum formed in a same manner as the first protection datum from the received data packet,
- a fourth comparer operable to generate a second data request if a first protection block of the data packet received together with data blocks differs from a second protection block formed in a same manner as the first protection block from the received data blocks,
- a third querier, operable to repeat previously transmitted data after detection of a first data request, and
- a fourth querier, operable to repeat previously transmitted data blocks after detection of a second data request.

13. An identification system comprising:
- a mobile data memory for the contactless exchange of protected data packets with a read-write device, having a first coding device, and
- a read-write device for the contactless exchange of protected data packets with a second mobile data memory, having a second coding device, the first coding device further comprising:
- a first comparer operable to generate a first data request if a protection datum received together with data in the data packet differs from a protection datum formed in a same manner,
- a second comparer operable to generate a second data request if a protection block of the data packet received together with data blocks differs from a protection block formed in a same manner,
- a first querier operable to repeat previously transmitted data after detection of a first data request, and
- a second querier operable to repeat previously transmitted data blocks after detection of a second data request, the second coding device further comprising:
- a third comparer operable to generate a first data request if a protection datum received together with data of the data packet differs from a protection datum formed in a same manner,
- a fourth comparer operable to generate a second data request if the protection block of the data packet received together with data blocks differs from a protection block formed in a same manner,
- a third querier, operable to repeat previously transmitted data after detection of a first data request, and
- a fourth querier, operable to repeat previously transmitted data blocks after detection of a second data request,
- wherein the read-write device and the data memory are together operable to exchange data packets via a contactless data transmission link.

14. The identification system of claim 13 wherein the exchange of data is based on ISO/IEC Standard 14443 for operation in an ISM frequency band.

15. The identification system of claim 13 wherein the exchange of data is based on ISO/IEC Standard 15693 for operation in an ISM frequency band.

16. The identification system of claim 14, wherein the ISM frequency band is of a wavelength of 13.56 MHz.

17. The identification system of claim 15, wherein the ISM frequency band is of a wavelength of 13.56 MHz.

* * * * *